United States Patent
Ross

[11] Patent Number: 6,151,058
[45] Date of Patent: Nov. 21, 2000

[54] DYNAMIC CONTROL OF LASER POWER IN ELECTROPHOTOGRAPHIC DEVICE TO PRODUCE ACCURATE POSITIVE AND NEGATIVE PRINTED OUTPUT

[75] Inventor: Robert C. Ross, Daphne, Ala.

[73] Assignee: Xante Corporation, Mobile, Ala.

[21] Appl. No.: 09/112,941

[22] Filed: Mar. 18, 1997

[51] Int. Cl.[7] ...................................................... B41J 2/47
[52] U.S. Cl. .......................... 347/251; 347/247; 347/237; 430/147; 430/334
[58] Field of Search ..................................... 358/401, 453, 358/459, 446, 445, 457; 347/237, 240, 247, 251; 430/334, 147, 48; 327/427

[56] References Cited

U.S. PATENT DOCUMENTS

| | | | |
|---|---|---|---|
| 4,353,628 | 10/1982 | Berman | 358/459 |
| 4,628,017 | 12/1986 | Tagoku | 430/48 |
| 4,814,886 | 3/1989 | Kuge et al. | 358/457 |
| 5,436,735 | 7/1995 | Tanabe et al. | 358/453 |
| 5,805,014 | 9/1998 | Price | 327/427 |

FOREIGN PATENT DOCUMENTS

| | | | |
|---|---|---|---|
| 359133568A | 7/1984 | Japan | G03G 15/00 |

*Primary Examiner*—N. Le
*Assistant Examiner*—Hai C. Pham
*Attorney, Agent, or Firm*—Laurence J. Marhoefer; Venable

[57] ABSTRACT

A method for controlling the intensity of an imaging laser of an electrophotographic device in order to produce both positive and negative output. This is accomplished by using a software controlled digital circuit to increase or decrease the power supplied to the laser based on the user's desire to print positive or negative output. When the user desires to print positive output, the laser is set to full power. When the user selects negative mode printing, the power to the laser is digitally reduced by a factor unique to the electrophotographic characteristics of the printing device.

6 Claims, 6 Drawing Sheets

Figure 6: Magnified Sample Output
PRIOR ART
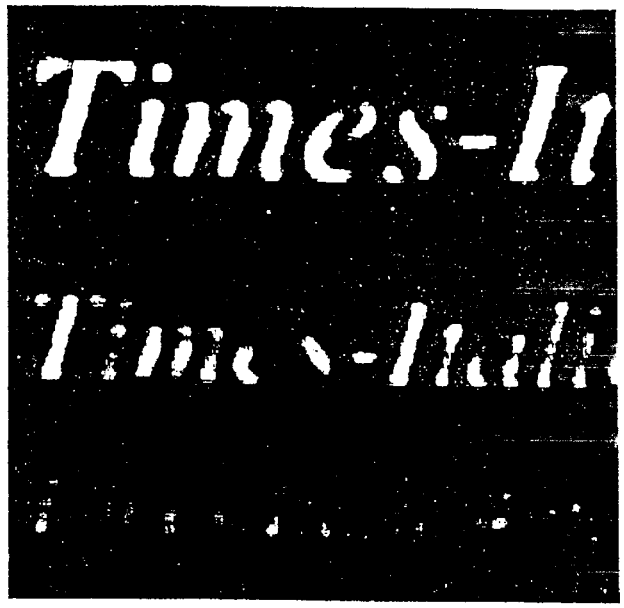
6A
Before Enhancement Technology
6B
With Enhancement Technology

DYNAMIC CONTROL OF LASER POWER IN ELECTROPHOTOGRAPHIC DEVICE TO PRODUCE ACCURATE POSITIVE AND NEGATIVE PRINTED OUTPUT

FIELD OF INVENTION

The present invention relates to the technique for dynamically controlling the laser power of electrophotographic print devices in order to produce the highest quality positive and negative printed output.

BACKGROUND OF THE INVENTION

Electrophotographic printing devices, typically referred to as laser printers, are designed to create an image by printing a series of dots on a print medium, typically paper. This image is created by a highly focused light source which is scanned at a specific rate across a charged surface of photosensitive material, typically referred to as the drum. This light source is modulated such that some areas are exposed and some are not, creating a predetermined pattern on the photosensitive material. The areas sensitized by the light source cause the material to bear a charge pattern corresponding to the desired image to be printed. The final printed material is created by the attraction of toner particles to the sensitized areas of photosensitive material and then transferring this toner to the print media.

The majority of electrophotographic print engines are developed by a few large manufacturers, e.g. Canon, Fuji-Xerox, Lexmark, Minolta, and Toshiba, and require the addition of a graphics controller which describes in an electronic form the page to be printed on the marking engine. Being that the largest customer desire is to produce the highest quality positive output, these devices are each individually tuned at the manufacturing factory to produce the best possible positive paper output. Solid state lasers are used by these vendors and each produces a slightly different laser intensity. This intensity is measured during the manufacturing process and a mechanical potentiometer is adjusted to bring the desired laser intensity to within manufacturing specifications. This mechanical potentiometer is then glued in order to secure the desired value for the life of the product.

Many users desire negative image output. That is, they want the printed output to be reversed, white areas are black and black areas are white. Typically the negative output is printed on a clear polyester film. Negatives are used in applications where ultraviolet light is applied to the negative output and penetrates the white (blank) areas to harden or weaken an emulsion such as for creating metal plate masters for an offset press, silk-screen masters and masters for rubber stamp creation. However, when a standard electrophotographic printer is used to create the negative output, the laser power, which is tuned to create positive output, is too strong and erases the white areas of the output (FIG. 6).

The laser in an electrophotographic device in theory only emits light at the precise area of the electrophotographic drum defined by the resolution of the printing device, typically 1/600 of an inch. In reality, in order to produce solid black areas and guarantee toner adhesion of the smallest light sensitized areas of the drum, the laser beam is actually about twice the width of the stated resolution of the print engine. The beam overlap created by the wider laser enhances positive output but causes image loss by excess toner attraction and therefore image loss on negative output. By decreasing the intensity of the solid state laser when creating negative output, the area of the drum sensitized by the laser is decreased and image integrity is maintained. As a byproduct of this decreased laser power, the black areas of the output grayed. These areas can be then blacked by an external process in order to block ultraviolet light, necessary when using negatives in the desired applications.

Many OEM print engines are available. Printer controller developers integrate their controllers into these OEM print engines and strive to differentiate their printers to enhance their particular market share. Typically, features are controller dependent functions such as emulations, fonts, and processing performance. In electrophotographic printers first a RAM based image of the page to be printed is created on the graphic controller at the resolution of the marking engine. This graphic controller then communicates with another controller which controls the mechanical aspects of the marking engine. This mechanical controller, typically called the DC controller, among other tasks, has primary control of two key elements of the engine, the main motor and laser scanner motor. The main motor is responsible for all media movement of the marking engine. The laser scanner is responsible for spinning the rotating mirror used to reflect the laser beam and therefore scan the laser beam across the moving photosensitive drum.

When the graphic controller communicates to the DC controller to start the printing process, the DC controller then starts the main and laser scanner motors. Paper movement now begins and is controlled by the main motor. This digital image of the page is then transferred to the light sensitive drum. The rate at which this transfer takes place is proportional to the rated speed of the marking engine. The drum rotates through a toner bin and toner is attracted to the light sensitized area of the drum. Toner is transferred to paper (or other media as appropriate) when toner is attracted away from the drum and to a highly charged roller located behind the media and intercepted by the media. The media is then heated by a fusing roller and toner is melted into the paper.

PROBLEMS WITH THE CONVENTIONAL APPROACH

The conventional approach requires the laser power be tuned to create either positive or negative output and therefore limits the use of the printing device to one of the applications but not both.

SUMMARY OF THE INVENTION

In accordance with the nature of this invention, the intensity of the solid state laser of an electrophotographic printing device, can be adjusted digitally in order to produce the best quality positive and negative print output. This adjustment is done by the series insertion of a software controlled potentiometer. The greater the resistance value programmed to the digital potentiometer, the less power generated by the solid state laser. The graphics controller of the print device, interpreting commands from the host computer, determines whether the print output is positive or negative and programs the digital potentiometer. The full power of the laser is used to generate positive output and an increased resistance value of the digital potentiometer is used to decrease the power of the laser in order to produce accurate negative output. For example a digital potentiometer with a value of 0 ohms generates the fill power of the laser for positive output and a value of 5000 ohms drops approximately half the laser power for negative output.

DETAILED DESCRIPTION OF A PREFERRED EMBODIMENT

Figure 1:
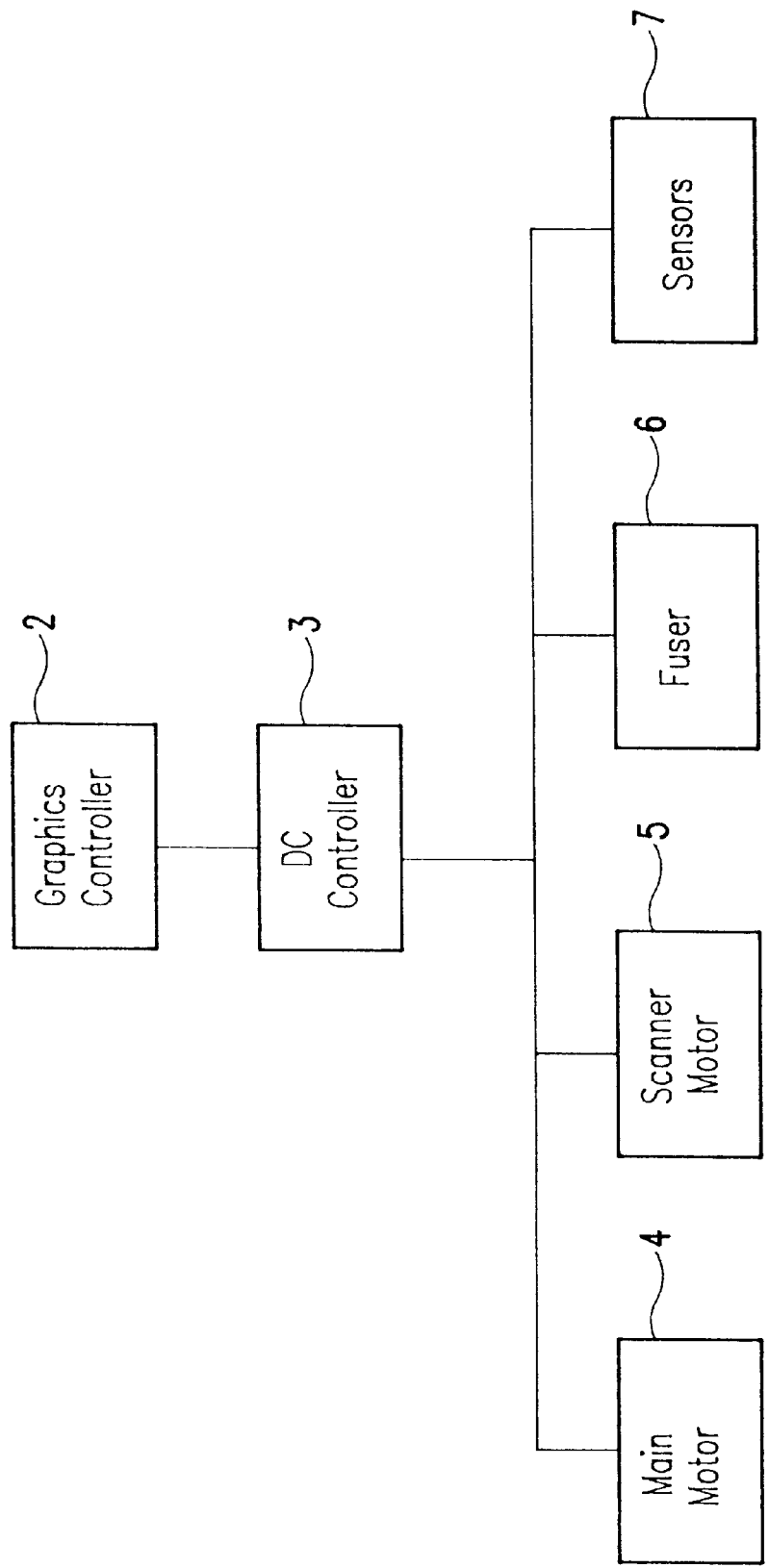
FIG. 1—Printer Overview
Figure 2:
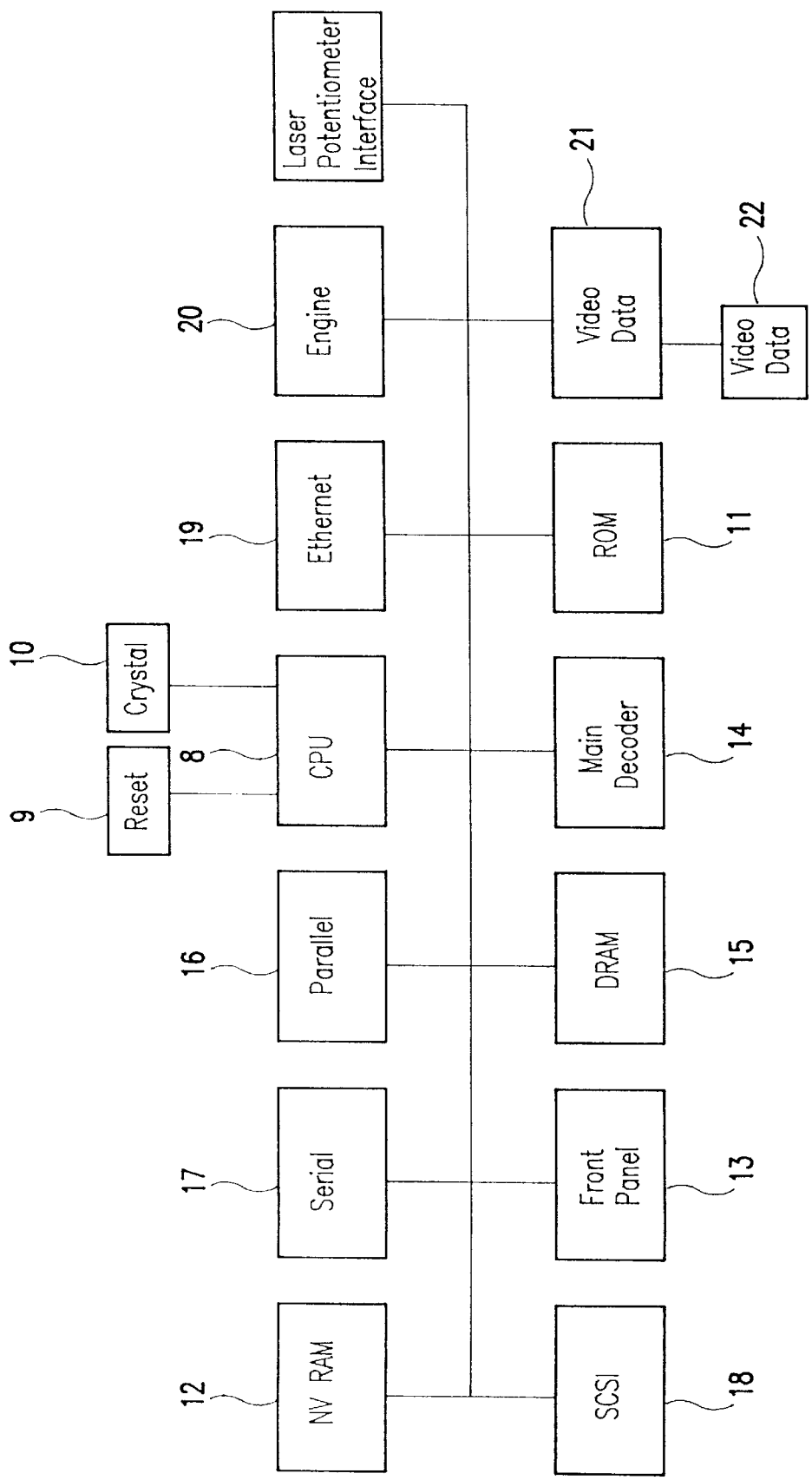
FIG. 2—Graphics Controller Overview
Figure 3:
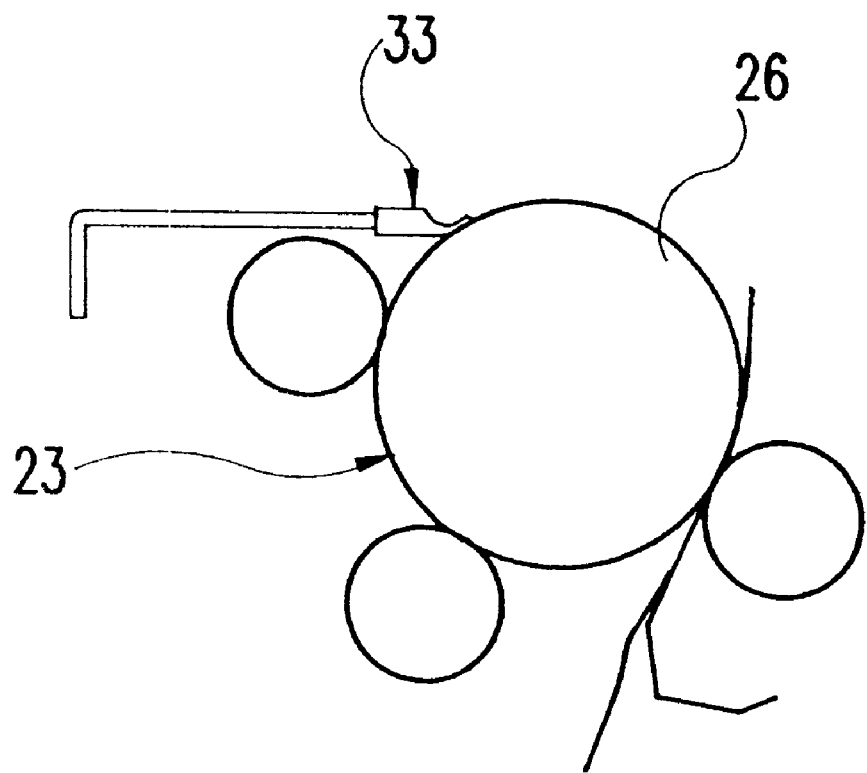
FIG. 3—Overview of Printing Process
FIG. 4—Scanner Motor Assembly
FIG. 5—Laser Power Circuit Schematic
FIG. 6A—Magnified Sample Output of Prior Art
FIG. 6B—Magnified Sample Output of Present Invention
Figure 4:
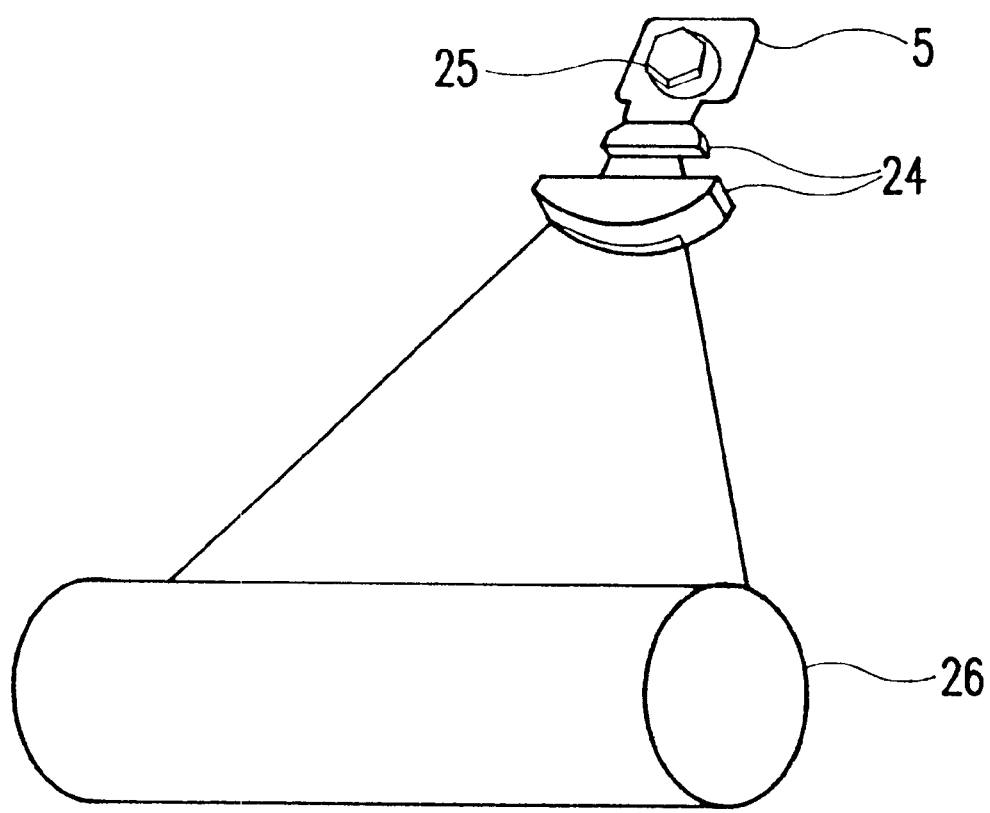
Figure 5:
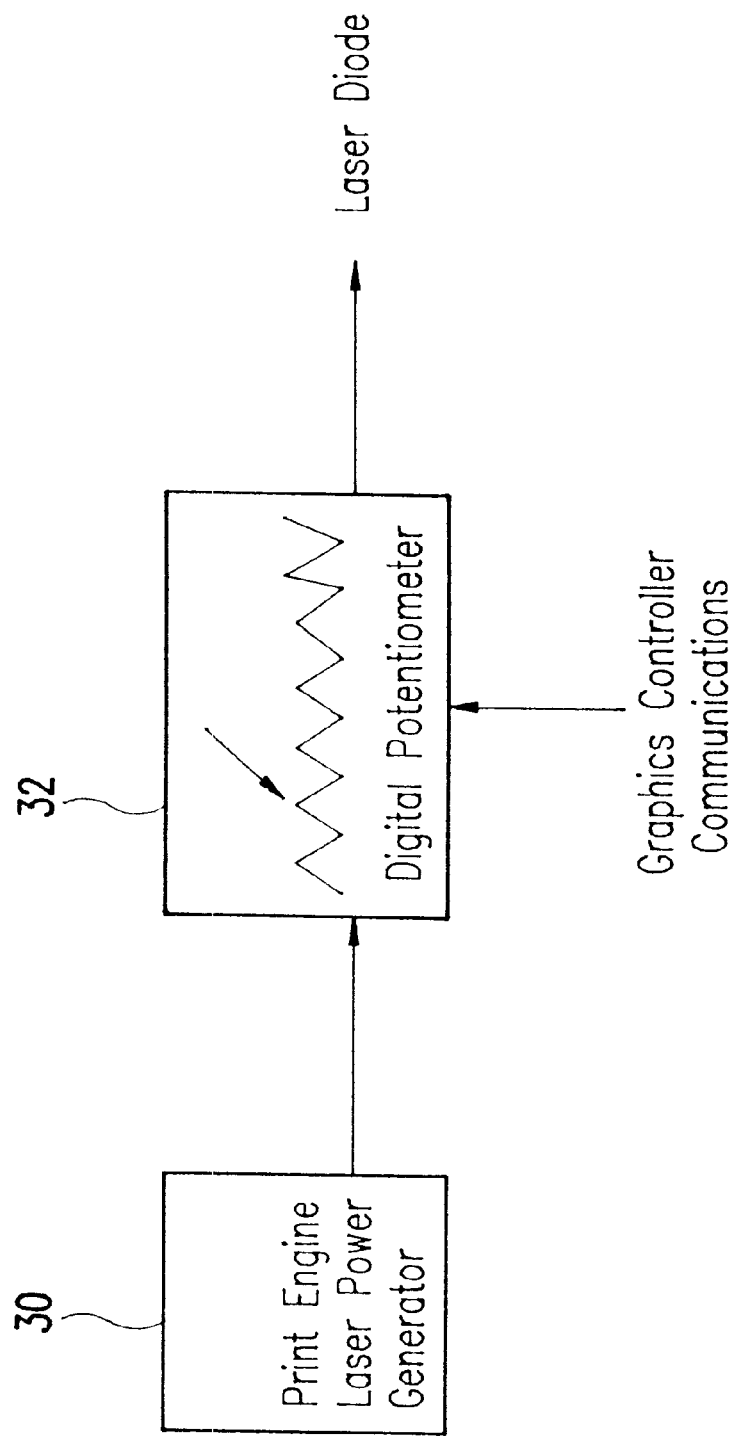

Referring to FIGS. 2, 3, 4 and 5. The present invention is described as applied to an electrophotographic printer, such as a laser beam printer, although it should be understood that the present invention is compatible with other forms of electrophotographic printers such as LED printers. In a LED printer the laser scanner unit does not exist. Instead of one laser creating the image on the surface of the drum, a series of LED's are aligned across the surface of the drum, one LED for every DPI of resolution. In this case all of the LED's power would be adjusted simultaneously in order to produce quality negatives. In electrophotographic printing, an image is first created on a MAIN COMPUTER 1. The user of this computer installs the correct driver software which matches the printing capability of the desired printer to the host software. During printing time the driver converts the desired image to be printed into a language understandable by the controller of the printing device. This data is then transferred to the intelligent GRAPHICS CONTROLLER 2 typically residing in the printer. From this data the GRAPHICS CONTROLLER 2 creates an exact image of the page to be printed in its DRAM 15.

The GRAPHICS CONTROLLER 2 has three main functions: receipt of the data from the host computer over a specified interface, interpretation of this data into an electronic image representing the page to be printed, and transfer of this image data to the marking engine. The GRAPHICS CONTROLLER 2 is controlled by CPU 8. The CPU 8 receives its reset from the RESET GENERATOR 9. The CPU 8 receives its clock from the CPU CRYSTAL OSCILLATOR 10. The CPU 8 itself is a 32 bit microprocessor that executes instructions stored in ROM 11. The ROM 11 is used to store CPU 8 instructions, data for creating characters and data for interpreting information coming from the host computer. The GRAPHICS CONTROLLER 2 also contains NVRAM 12 which is used to store the page count and setup information specified by the user without being erased by loss of power. The FRONT PANEL INTERFACE 13 is used to communicate with an LCD module for displaying printer status and button keys used to input setup information into the graphics controller. The MAIN DECODER AND CONTROL 14 determines the peripheral circuit to be accessed during a CPU 8 execution cycle and supplies the control signal for the specific timing characteristics required by each peripheral. The DRAM 15 is used by the CPU 8 to store information about the current execution parameters of the CPU 8, store incoming data from the host computer and store a bit mapped image of the page being created and printed. The PARALLEL INTERFACE 16 controls the transfer of data from the host computer to the graphics controller over this interface. The SERIAL INTERFACE 17 controls the transfer of data between the graphics controller and a host computer when the host computer desires to send data serially. The SCSI INTERFACE 18 is used to control hard disks for permanent storage of fronts from the host computer and as a extension of the main DRAM 15 memory, although the hard disk is slower and is only used when DRAM 15 space is exhausted. The ETHERNET INTERFACE 19 is used to control data from the host computer when transfer is desired over an ethernet network. The ENGINE CONTROL AND STATUS 20 circuit is responsible for bidirectional communications with the DC controller. The VIDEO DATA CONTROL 21 circuit is responsible for the proper generation and timing of image data as it is transferred to the DC CONTROLLER 3 during page printing. The rate at which image data is transferred is specified by the clock rate of the VIDEO CLOCK CRYSTAL 22.

Once created, the GRAPHIC CONTROLLER 2 determines whether the printed output is of positive or negative form and programs the DIGITAL POTENTIOMETER to either retain the current laser power for positive output or an increased resistance low power mode for negative output. The GRAPHIC CONTROLLER 2 then communicates with another controller located inside the printer that is ready to begin printing. This second controller, typically called the DC CONTROLLER 3, is responsible for controlling the MAIN MOTOR 4, SCANNER MOTOR 5, FUSER 6, and SENSORS 7 reporting all error detection such as paper jams, paper sizes, optional trays, fusing temperature, etc.

The DC CONTROLLER 3 signals the MAIN MOTOR 4 and SCANNER MOTOR 5 to begin to rotate. At this time the entire surface of the electrostatic DRUM 26 is being cleaned and recharged. The cleaning is accomplished by the application of a rubber CLEANING BLADE 33 which scrapes the surface of the DRUM 26, removing any leftover toner particles. The surface of the DRUM 26 is also electrostatically cleaned by an erasing charge usually a electromagnetic field of several hundred volts. After the proper speed and paper movement has been detected by the DC CONTROLLER 3, it notifies the graphics controller it is ready to begin imaging the page. The GRAPHIC CONTROLLER 2 begins transferring the data, typically referred to as video data, in a serial stream at a predetermined rate proportional to that of the speed of the laser printer, to the DC CONTROLLER 3 in one line increments. At the same time the DC CONTROLLER 3 passes this video data to the LASER 23, pulsing the LASER 23 on and off corresponding to the DRAM 15 image of the page being printed.

The LASER 23 beam is produced by a solid state laser which is turned on and off by supplying or denying power. The light produced by the LASER 23 is then highly focused by a COLLIMATOR LENS 24 onto a ROTATING MIRROR 25 atop the SCANNER MOTOR 5. This ROTATING MIRROR 25 is a six-sided rotating polygon mirror whose purpose is to sweep this highly focused LASER 23 beam across the surface of the photosensitive cylindrical DRUM 26. Areas of the drum not charged by the LASER 23 remain at a potential of negative 600 volts. Areas charged by the LASER 23 are now at negative 100 volts.

During this printing process the DC CONTROLLER 3 also monitors SENSORS 7 inside the printer which track paper movement. The DC CONTROLLER 3 is preprogrammed with information about the speed of the engine and which SENSORS 7 should detect paper at which time in the printing process. If these SENSORS 7 do not report paper detection in the proper time frame proportional to that of the speed of the printer the DC CONTROLLER 3 stops the MAIN MOTOR 4 and SCANNER MOTOR 5 movement and reports an error to the GRAPHICS CONTROLLER 2.

Assuming no errors are detected in the printing process the LASER 23 images an exact replica of the desired printed output at the correct power level onto the surface of the electrophotographic DRUM 26.

The DRUM 26 rotates at the rate controlled by the MAIN MOTOR 4 through what is known as the DEVELOPER 27.

The DEVELOPER 27 material called toner adheres to the areas of the DRUM 26 currently at negative 100 volts potential and not the negative 600 volt areas. The toner is a black plastic resin ground to between 6 and 12 microns in size and is bound to iron particles. The iron particles are attracted to a rotating cylindrical magnet located inside the DEVELOPER 27 unit. The toner particles obtain a negative charge by contacting this cylinder which is connected to a negative DC supply. This negative charge of the toner particles cause them to attract to the areas of the drum exposed by the LASER BEAM 23.

The paper, which is traveling at the same speed as the electrophotographic DRUM 26, contacts the surface of the DRUM 26. A TRANSFER CHARGING ROLLER 34 produces a strong positive charge onto the back side of the paper as it is moving across the DRUM 26. This stronger positive charge pulls the toner from the DRUM 26 and onto the paper. The paper moves to a FUSER 6 where a Teflon drum preheated to 360 F. by an internal heating lamp controlled by the DC CONTROLLER 3 and rotates at the same speed as the paper and DRUM 26, and melts and forces the toner into the paper with the force of a soft back roller.

The DC CONTROLLER 3 is responsible for controlling all of the mechanical functions of the laser printer. It contains a central processing unit (CPU 28), which is controlled by crystal timing, read-only memory (ROM 29), SENSORS 7 which detect engine functions, and control signals which drive the SCANNER MOTOR 5, MAIN MOTOR 4, and LASER BEAM 23.

In the preferred embodiment of the invention in which the printer engine 30 is the Canon LBP-BX2 8 page-per-minute laser printer and integrated with a GRAPHICS CONTROLLER 2 and sold under the name PlateMaker II by Xante Corporation at 4621 Spring Hill Avenue, Mobile, Ala. 36608 with the insertion of a DIGITAL POTENTIOMETER 32, controlled by the GRAPHICS CONTROLLER 2, in series with the LASER BEAM 23 is programmed to induce the following values 0 ohms—Positive Mode Printing, Full Power 5000 ohms—Negative Mode Printing thereby reducing the power of the LASER BEAM 23 by approximately half in order to produce the highest quality negative output. As an alternative to the DIGITAL POTENTIOMETER 32, other arrangements can be used so that a first power level can be coupled to the laser when the image to be produced is a positive image and a second power level, lower than the first power level, can be coupled to the laser when the image to be produced is a negative image. For example, a power source can be used which puts out two power levels, and the graphics controller can couple the higher power output to the laser when the image is to be a positive image, and can couple the lower power output to the laser when the image is to be a negative image.

It will be apparent to those skilled in the art and it is contemplated that variations and/or changes in the embodiments illustrated and described may be made without departure from the present invention. Accordingly, it is intended that the foregoing description is illustrative only, not limiting, and that the true spirit and scope of the present invention will be determined by the appended claims.

What is claimed is:

1. A method of forming positive and negative pixel images on a light sensitive surface from a same light source, comprising the steps of:

operating said light source at a first power level that causes an overlap of adjacent pixels on said surface in producing a positive image;

operating said light source at a second power level that is less than said first power level in producing a negative image.

2. A method of forming positive and negative pixel images on a light sensitive surface from a same light source, comprising the steps of:

operating said light source at a first power level that causes approximately a 20 percent overlap of adjacent pixels on said surface in producing a positive image;

operating said light source at a second power level that is approximately 50% less than said first power level in producing a negative image.

3. A laser printer for forming positive and negative pixel images on a light sensitive surface, comprising in combination:

a light source;

a graphics controller for turning on and off said light source in accordance with bit mapped pixel data of an image to be formed on said light sensitive surface;

a power supply connected to said light source;

said power supply having a first operating power level and a second operating power level respectively selectable by said graphics controller;

said first operating power level causing said laser to form a pixel image on said light sensitive surface that overlaps adjacent pixel images;

said second operating power level being less than said first power level so that laser operating at said second power level causes said laser to form pixel images on said light sensitive surface that do not substantially overlap adjacent pixel images;

said graphics controller selecting said first power level to form positive pixel images and said second power level to form negative pixel images.

4. A laser printer for forming positive and negative pixel images on a light sensitive surface as in claim 3, wherein said power supply is connected to said light source by a software controlled digital potentiometer.

5. A laser printer for forming positive and negative pixel images on a light sensitive surface, comprising in combination:

a light source;

a graphics controller for turning on and off said light source in accordance with bit mapped pixel data of an image to be formed on said light sensitive surface;

a power supply connected to said light source;

said power supply having a first operating power level and a second operating power level respectively selectable by said graphics controller;

said first operating power level causing said laser to form a pixel image on said light sensitive surface that overlaps adjacent pixel images by about 20 percent;

said second operating power level being about 50 percent less than said first power level so that laser operating at said second power level causes said laser to form pixel images on said light sensitive surface that do not substantially overlap adjacent pixel images;

said graphics controller selecting said first power level to form positive pixel images and said second power level to form negative pixel images.

6. A laser printer for forming positive and negative pixel images on a light sensitive surface as in claim 5, wherein said power supply is connected to said light source by a software controlled digital potentiometer.

* * * * *